US005849142A

United States Patent [19]

Fuehrer et al.

[11] Patent Number: 5,849,142

[45] Date of Patent: Dec. 15, 1998

[54] THREE-DIMENSIONAL SEAL APPLICATOR

[75] Inventors: Charles Fuehrer, Scarsdale; Erwin Ruegg, Tompkins Cove, both of N.Y.

[73] Assignee: Stoffel Seals Corporation, Nyack, N.Y.

[21] Appl. No.: 651,788

[22] Filed: May 24, 1996

[51] Int. Cl.[6] .......... B32B 31/00

[52] U.S. Cl. .......... 156/556; 156/567; 156/542; 156/514; 156/69; 53/485

[58] Field of Search .......... 156/567, 556, 156/566, 540, 541, 542, 514, DIG. 31, 361, 568, 572; 53/471, 485

[56] References Cited

U.S. PATENT DOCUMENTS

| | | | |
|---|---|---|---|
| 3,159,521 | 12/1964 | Pechmann . | |
| 3,888,724 | 6/1975 | Spannknebel et al. . | |
| 4,323,416 | 4/1982 | Malthouse et al. . | |
| 4,548,668 | 10/1985 | Roth et al. | 156/567 X |
| 4,687,535 | 8/1987 | Voltmer . | |
| 4,915,565 | 4/1990 | Bond et al. | 156/567 X |
| 5,102,485 | 4/1992 | Keeler et al. . | |
| 5,116,452 | 5/1992 | Eder . | |
| 5,486,253 | 1/1996 | Otruba | 156/567 X |
| 5,489,360 | 2/1996 | Shimizu et al. | 156/567 X |

*Primary Examiner*—James Engel
*Attorney, Agent, or Firm*—Dowell & Dowell, P.C.

[57] ABSTRACT

An applicator for applying surface relief three-dimensional seals or medallions to containers which includes a rotatable transfer ring having a plurality of seal retaining receivers therein formed therein in which plungers are reciprocally mounted. A vaccuum header is associated with the ring so as to create reduced pressure in the receivers for removing seals from a carrier tape and retaining the seals within the receivers as the transfer ring is indexed to align the seals with containers being conveyed relative to the applicator. An activator is provided for urging the plungers from the receivers to thereby apply the seals retained therein against aligned containers.

20 Claims, 8 Drawing Sheets

THREE-DIMENSIONAL SEAL APPLICATOR

BACKGROUND OF THE INVENTION

1. Field of the Invention

This invention is generally directed to machines for applying labels or seals to containers and especially to an applicator for applying molded three-dimensional seals or medallions to a series of containers being conveyed along a bottling or packaging line. Further, the present invention is directed to seal applicators wherein seals are continuously and sequentially removed from a carrier tape or strip and retained within a plurality of seal receivers under a vaccuum applied to the receivers until the seals are appropriately aligned and applied to the containers.

2. History of the Related Art

In the bottling and packaging industry, it has been known to apply labels which are adhesively mounted to a carrier strip to a plurality of containers being conveyed along an assembly line by withdrawing the labels from the carrier strip by way of the application of a vacuum or partial vaccuum. Some of the prior art label applicators utilize wheels or drums having incorporated therewith a vaccuum system for applying a reduced pressure at points along the periphery of the wheels or drums. The wheels or drums are rotated so as to bring a portion of the periphery thereof into alignment with a label carried by the carrier strip. The label is removed from the carrier strip under the influence of the reduced pressure and the backing tape conveyed to a collection reel. Thereafter, the wheels or drums of the applicators are rotated toward a plurality of containers which are conveyed along a bottling or packaging line. When the labels carried by the wheels or drums align with the containers, the vaccuum is relieved and the labels are forced against the surface of the container which are in close proximity to the rotating drums or wheels. Some examples of such prior art devices are disclosed in U.S. Pat. Nos. 4,323,416 to Malthouse, et al., 4,687,535 to Voltmer and 5,102,485 to Keeler, et al.

Unfortunately, the prior art applicator machinery of the type set forth above are designed for specific use with pliable and generally flat labels. The applicators cannot be utilized for purposes of transferring and applying three-dimensional molded seals or medallions on containers.

Many manufacturers desire to place seals in three-dimensional relief on the surface of containers to provide a unique indication of origin of the container. Also, it is desirable to provide a further distinctive application of seals to containers wherein mechanically applied seals take on an appearance of an original, hand-applied wax seals. Unfortunately, typical labeling and applicator machines utilized to apply seals to containers are not capable of applying a variety of three-dimensional seals having varying configurations to a series of containers. Therefore, there is a need in the industry to provide an apparatus for applying seals which are formed in three-dimensional relief in a variety of configurations to containers in a continuous process.

Additional examples of prior art are disclosed in U.S. Pat. Nos. 3,159,521 to Pechmann, 3,888,724 to Spannknebel, et al. and 5,116,412 to Udder.

SUMMARY OF THE INVENTION

The present invention is directed to an applicator for applying three-dimensional surface relief molded plastic seals or medallions to containers which includes a rotary indexed transfer ring having a plurality of generally equally spaced seal retaining receivers formed in the periphery thereof. The receivers are formed including a plurality of plunger elements having heads which are seated in a recessed manner within open bushings seated within the periphery of the ring. The ring is mounted to a sprocket which is secured to an indexing device which is, in the preferred embodiment, driven in synchronization with a collection reel for a carrier tape upon which the seals or medallions are supplied to the applicator. The carrier tape is provided with a releasable coating with the seals and medallions having a separately applied adhesive on the rear surface thereof which adhesive is used to secure the seals to the containers when the seals are placed in contact therewith by the applicator.

Also, in the preferred embodiment, a plurality of openings are provided through the walls of the transfer ring which communicate with openings in the bushings of the receivers. These openings communicate with passageways in the plungers mounted within the bushings. A vaccuum header is provided which extends along a segment of the transfer ring and in substantially sealed engagement therewith. As pressure is reduced by a suitable source of vaccuum, air is withdrawn in the area of each receiver through the head of a related plunger and conveyed outwardly through the openings in the bushings and transfer ring so that a reduced pressure or partial vaccuum is created in each receiver which is in communication with the vaccuum header. The vaccuum or area of reduced pressure is only provided in receivers oriented between a seal transfer point, wherein the seals are initially aligned with the receivers in the transfer ring, and a seal applicator point, wherein the seals are aligned with containers to which the seals are applied.

The invention further includes a plunger activator which is timed so as to force each plunger toward a container when a receiver is appropriately aligned with a container conveyed relative to the applicator. In the preferred embodiment, cushioning and sealing elements such as gaskets or 0-rings are provided in the receivers in surrounding relationship to the plunger elements so as to both assist in creating the vaccuum in the receivers to retain the seals therein and to prevent any damage to the molded seals as the seals are retained, carried and forced from the receivers.

In the preferred embodiment, the transfer ring is removably mounted to the sprocket wheel so that separate rings having different sizes of receivers formed therein can be easily interchanged with one another so that different sizes of three-dimensional seals may be applied utilizing the same applicator.

Also, in the preferred embodiment, an adjustable feed mechanism is provided for selectively spacing the carrier tape relative to the transfer ring so that seals of different thickness dimensions may be easily compensated for.

It is a primary object of the present invention to provide an applicator for applying three-dimensional molded seals to containers wherein the seals are removed from a continuous carrier tape under vaccuum in such a manner that the surface relief characteristics of the seals is protected.

It is also an object of the present invention to provide an applicator for placing three-dimensional molded seals on containers in a continuous process wherein the seals may have surface and border characteristics which are different from one seal to another yet wherein the seals are sequentially removed and retained within a plurality of receivers which are designed to support the seals as they are indexed towards an application point and applied to containers.

It is yet another object of the present invention to provide an apparatus for applying three-dimensional molded seals to containers wherein the seals are transferred from a carrier tape to a transfer ring having a plurality of receivers for receiving the seals wherein the ring may be selectively interchanged so that seals of substantially differing characteristics may be applied to containers along the same bottling or packaging line without requiring further modification to the applicator.

It is another object of the present invention to provide an applicator for applying molded three-dimensional seals to containers wherein the transfer of the seals from a source of supply to the containers is accomplished in such a manner that a variety of seals having different surface characteristics may be continuously applied to the containers in random order without adversely affecting the integrity of the seals.

BRIEF DESCRIPTION OF THE DRAWINGS

A better understanding of the invention will be apparant from a review of the drawings wherein.

DESCRIPTION OF THE PREFERRED EMBODIMENT

Figure 12:
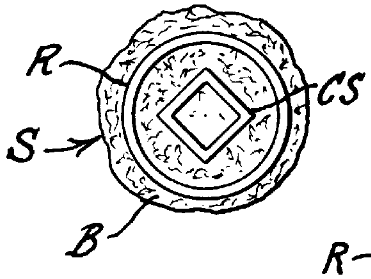
FIGS. 12 and 13 are top plan views of two seals having varying upper surface border configurations of a type which can be applied utilizing the same transfer ring of the present invention.
Figure 13:
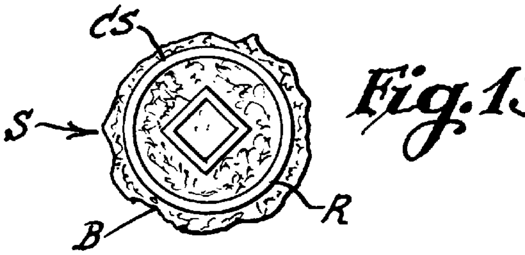
Figure 14:
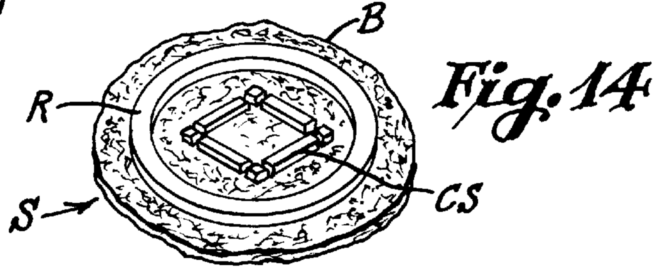
FIG. 14 is a perspective view illustrating one type of seal which may be applied utilizing the applicator of the present invention.

The present invention was developed in order to apply three-dimensional seals or medallions which are molded from a plastic material to containers in a continuous process such as along a bottling line where containers are filled, capped and labeled. It should be noted that the applicator of the present invention may be utilized to place three-dimensional seals or medallions on substantially any type of container in a continuous process. By way of example, and with specific reference to FIGS. 12–14, the seals "S" are molded having a high relief outer surface and a backing or lower surface of a configuration to be complimentary to the surface of the container to which the seals are to be applied. Seals are preferably placed on a carrier strip or tape "T" having a releasable adhesive thereon with each seal having a separate adhesive on its rear surface for securing the seal to a container "C" being conveyed along a bottling or packaging line.

One of the unique features of the present invention is that the applicator may be utilized to apply seals having substantially different surface configurations from one seal to another along the length of the carrier tape "T". In some embodiments, the seals may be formed having substantially similar central surface portions "CS" with border portions "B" which are substantially different from one seal to another. This is particularly advantageous when the seals are to be applied to containers so as to simulate hand-applied wax seals wherein the border portions of the seals are not the same from seal to seal. In some embodiments, the seals may also be molded so as to provide a defined annular rim "R" intermediate the central portion of the outer surface of the seal and the border portion for purposes of facilitating the manner in which the seals can be transferred according to one embodiment of the present invention.

With specific reference to FIGS. 1–4, the applicator 20 of the present invention includes a stand 21 which is designed to be positioned adjacent a conveyor 22 upon which containers "C" are transported. The containers may be stabilized by use of a backing screw conveyor 23, as partially illustrated in FIG. 1. Mounted to the lower portion of the stand 21 is a first indexing device 25 having a drive shaft 26 to which a collection reel 27 is secured. Mounted to the upper portion of the stand 21 is a second indexing device 28 having a drive shaft 29 to which a sprocket wheel 30 is secured. The sprocket wheel includes a central hub 31 and a plurality of outwardly extending arms 32 which are connected at their outer end to an annular disc 34. The indexing device 28 is driven in synchronization with the indexing device 25 for purposes to be described in greater detail hereinafter.

Figure 6:
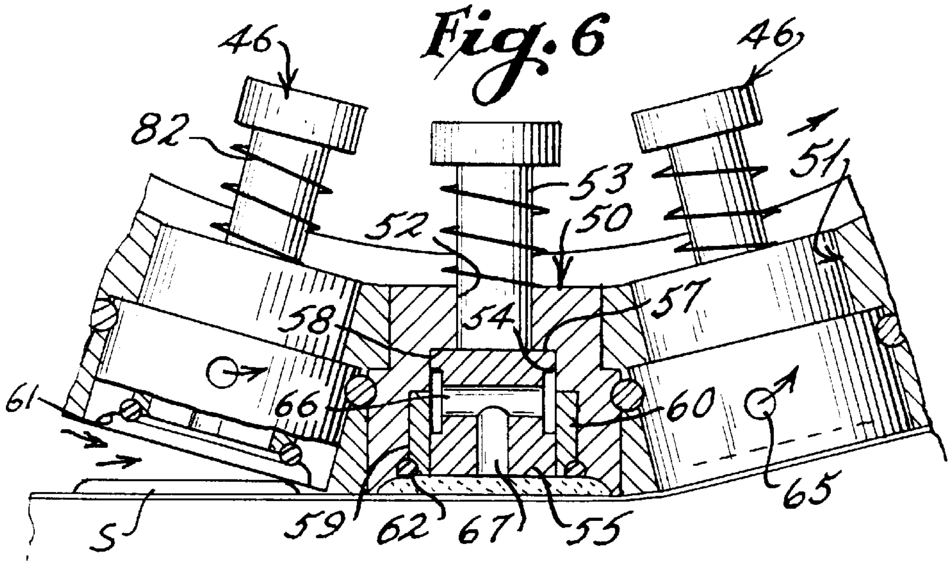
FIG. 6 is an enlarged cross-sectional view taken along line 6—6 of FIG. 2.

The sprocket wheel disc 34 has a plurality of openings 35 therethrough through which locking bolts 36 are selectively extended. The locking bolts are utilized to secure interchangeable transfer rings 40 to the sprocket wheel. Each transfer ring 40 includes an inner annular wall 41 having a plurality of threaded openings therein for selectively receiving the bolts 36. The transfer rings further include an outer annular wall 43 having a plurality of spaced openings 44 therein. Each transfer ring further includes a peripheral outer wall having a plurality of equally spaced receivers 45 recessed therein for purposes of receiving and retaining the seals "S". Plungers or pusher elements 46 are reciprocally mounted within each receiver. The size and configuration of the receivers 45 in a given transfer ring are substantially identical. However, due to the removable mounting of the transfer ring relative to the sprocket wheel 30, it is possible to easily install other transfer rings having receivers of either larger or smaller size or configuration. It is necessary that the diameter "D" of the receivers 45 be slightly greater than the maximum diameter of any of the seals, such as "S1 or S2" shown in FIGS. 12 and 13, which are to be applied to containers utilizing the transfer ring. With particular reference to FIG. 6, the spacing between each receiver 45 is designed to exactly duplicate the spacing between the seals "S" carried by the carrier tape "T" so that, as the carrier tape is moved into close proximity with the pockets, the seals will be properly seated therein.

The receivers 45 are formed by inserting a hollow bushings 50 within stepped openings 51 formed through the transfer ring. Each bushing includes a center opening 52 of a size to receive a stem 53 of a plunger 46 slidably therethrough. The opening 52 is aligned with an outer concentric opening 54 in which the head 55 of the plunger 46 is normally seated. The rear edge 57 of the plunger normally abuts an annular ledge 58 created by the bushing which limits the innermost reciprocating travel of the plunger 46. The bushing further includes an outermost concentric opening 59 in which an annular sleeve 60 is press fitted. The sleeve 60 is designed to provide guidance for the reciprocating pusher or plunger 46 and is preferably formed of a material having a low coefficient of friction. The outer portion of the outermost opening in the bushing is curved or bevelled as shown at 61 so as to provide a smooth surface for receiving the seals "S". An 0-ring or gasket 62 is seated within an annular groove formed in the bushing and extends slightly into the receiver 45 for purposes of providing both a seat for facilitating the application of a vaccuum within the receiver as well as to function as a cushion for a seal being retained within the receiver, as shown in FIG. 6.

The seals are urged into the receivers 45 under the influence of a vaccuum or partial vaccuum which is applied to the area of each receiver 45 by way of the openings 44 provided in the transfer ring 40. The openings 44 communicate with openings 65 provided through each bushing 50 which openings 65 communicate with passageways 66 and 67 formed in a T-shaped configuration within the head 68 of each pusher or plunger 46.

Figure 3:
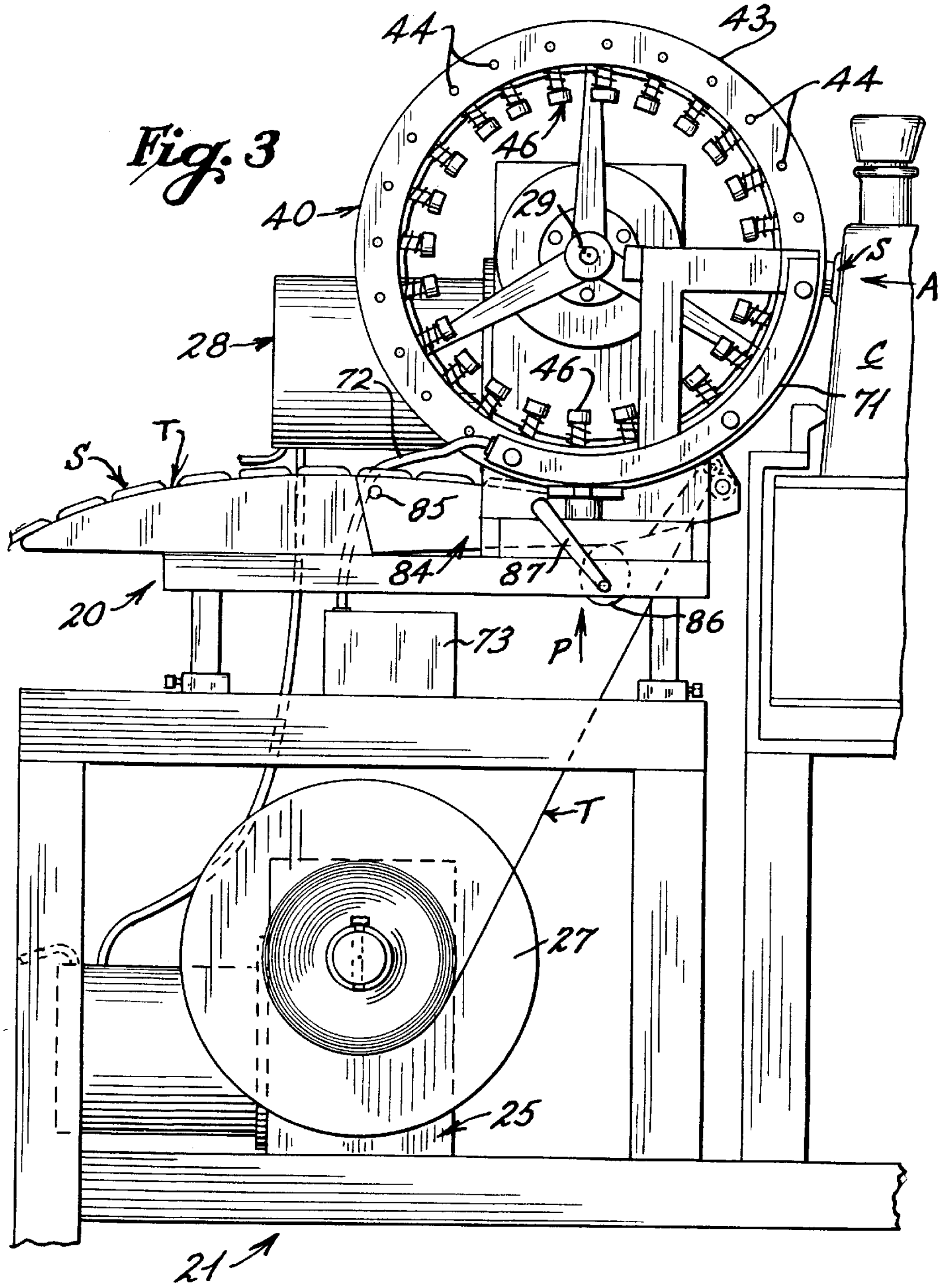
FIG. 3 is a left side view of the applicator of FIG. 1 showing the supply of seals being fed on a carrier tape.
Figure 4:
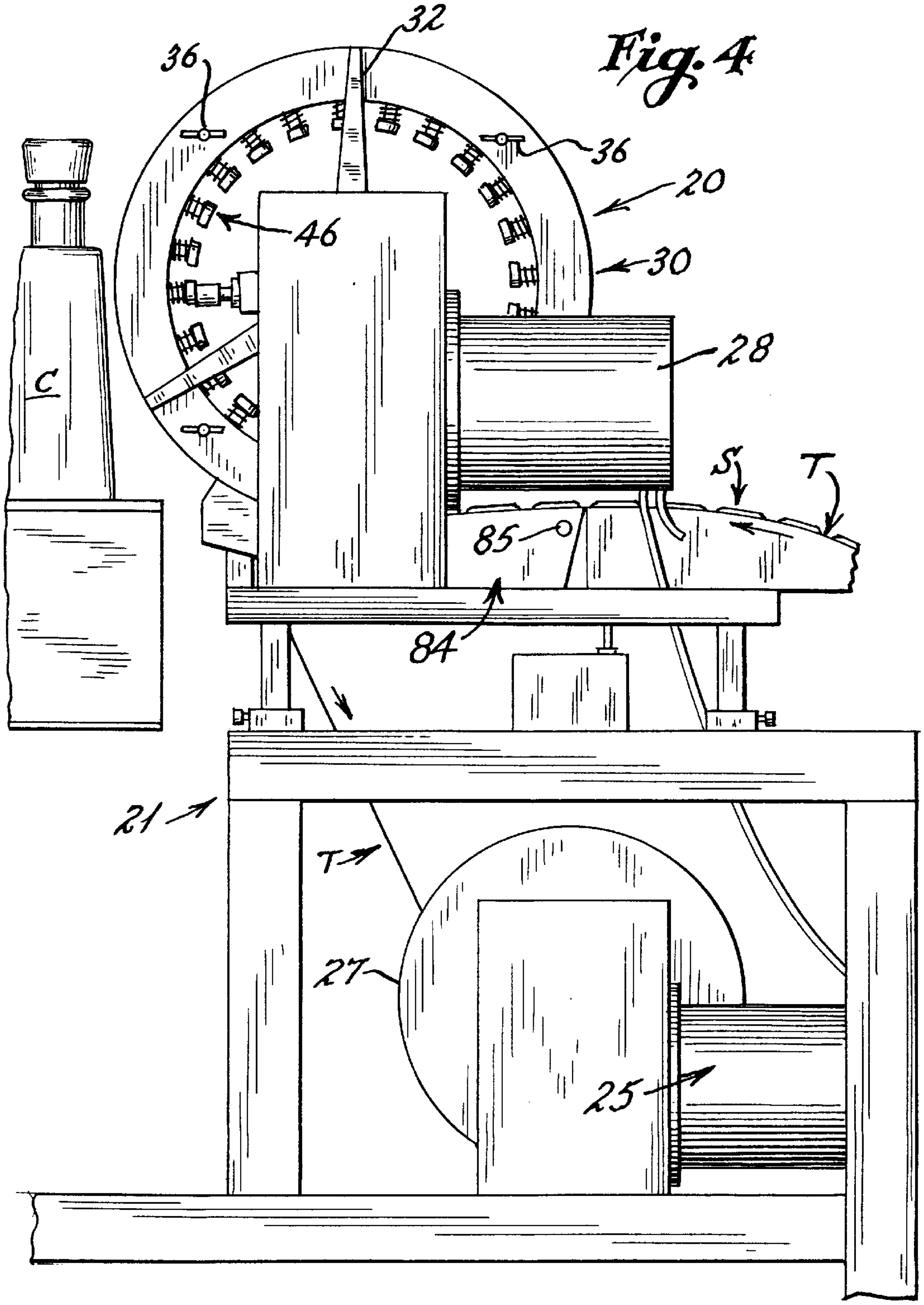
FIG. 4 is a right side elevational view of the applicator of FIG. 1.

The vaccuum is applied through an assembly 70 which includes an arcuate header or housing 71 which extends along a portion of the outer wall 43 of the transfer ring. The arcuate housing 71 is connected by a vaccuum line 72 to a suitable pump 73 for developing a reduced pressure within the housing. It is necessary to provide the reduced atmosphere or vaccuum in the area of the receivers 45 at a time when the receivers begin to align with the seals "S" at a transfer point "P". Therefore, as each receiver 45 approaches the tape "T", a suction is developed which is sufficient to pull the seals from the adhesive coating which covers the carrier tape. The housing 71 extends a sufficient distance to allow the receiver in which the seal is seated to align with a container "C" at an application point "A", as shown in FIGS. 3 and 5.

Figure 7:
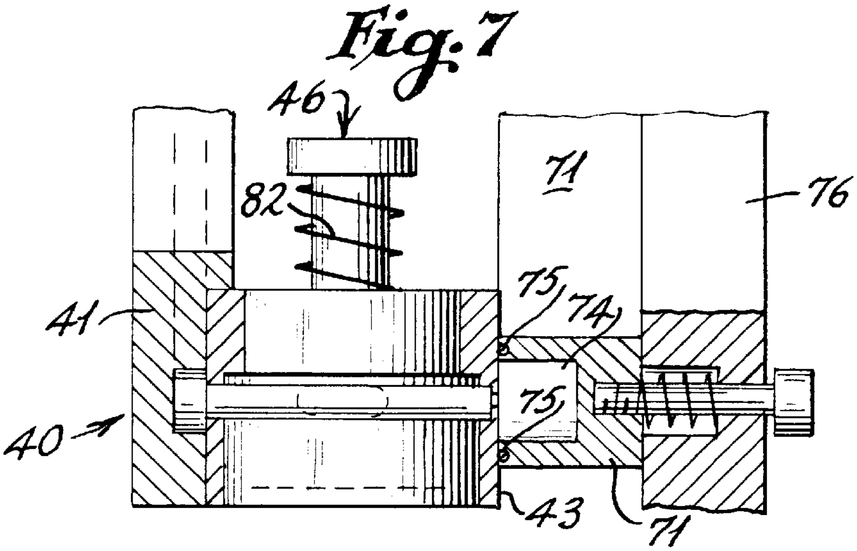
FIG. 7 is an enlarged partial cross-sectional view taken along line 7—7 of FIG. 5.
Figure 8:
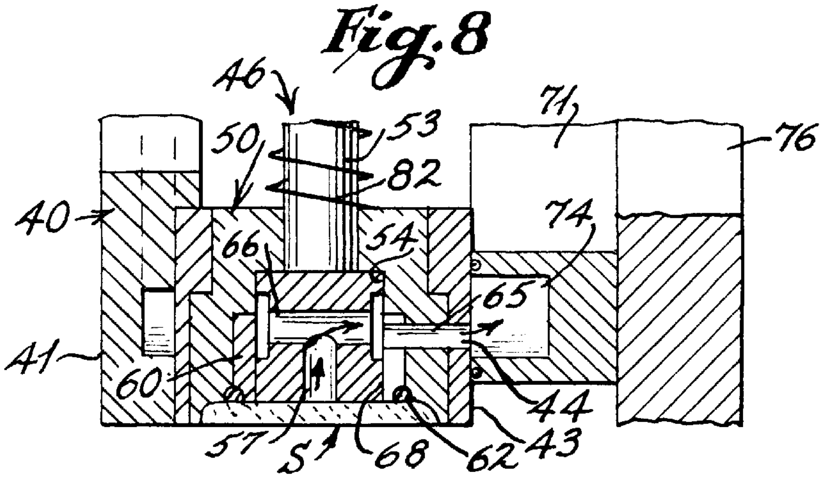
FIG. 8 is an enlarged partial cross-sectional view taken along line 8—8 of FIG. 5.

With specific reference to FIGS. 7 and 8, the vaccuum housing 71 includes an open, generally U-shaped channel 74 which is sealed with respect to the outer wall 43 of the transfer ring by a continuous gasket 75 which is slidingly engaged with the side wall. The flow of air creating the vaccuum is illustrated specifically in FIG. 8 where the arrows show the suction through the passageways 66 and 67 in the head of the plunger 46 passing through the opening 65 in the bushing and the corresponding opening 44 in the transfer ring to the open channel 74 in the vaccuum housing. Once the seal has been applied to a container, there is no longer a necessity to provide a vaccuum and therefore, the vaccuum housing terminates just beyond the point of seal application point "A".

Figure 1:
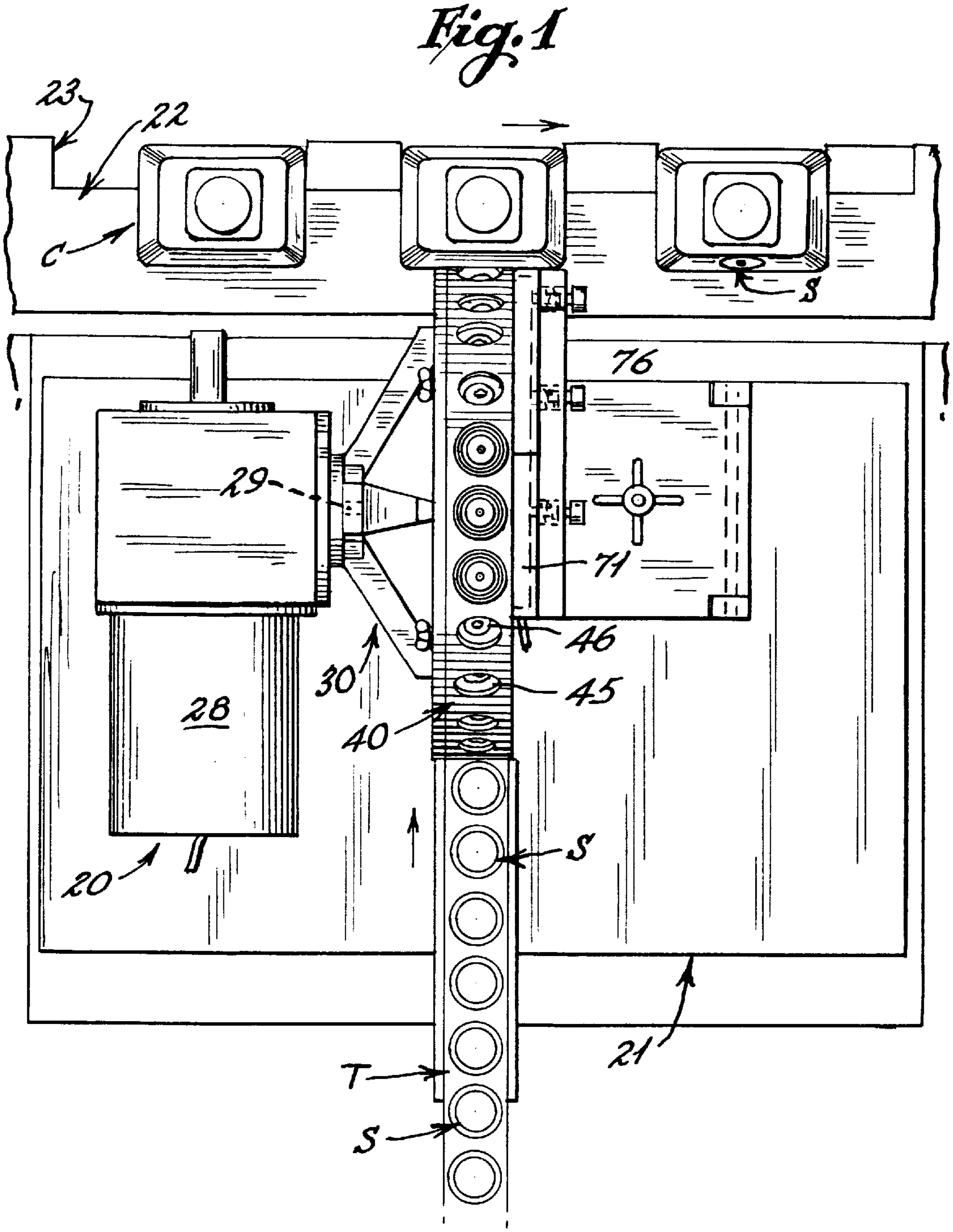
FIG. 1 is a top plan view of the three-dimensional seal applicator of the present invention shown as being utilized to apply seals to containers being conveyed relative thereto.
Figure 2:
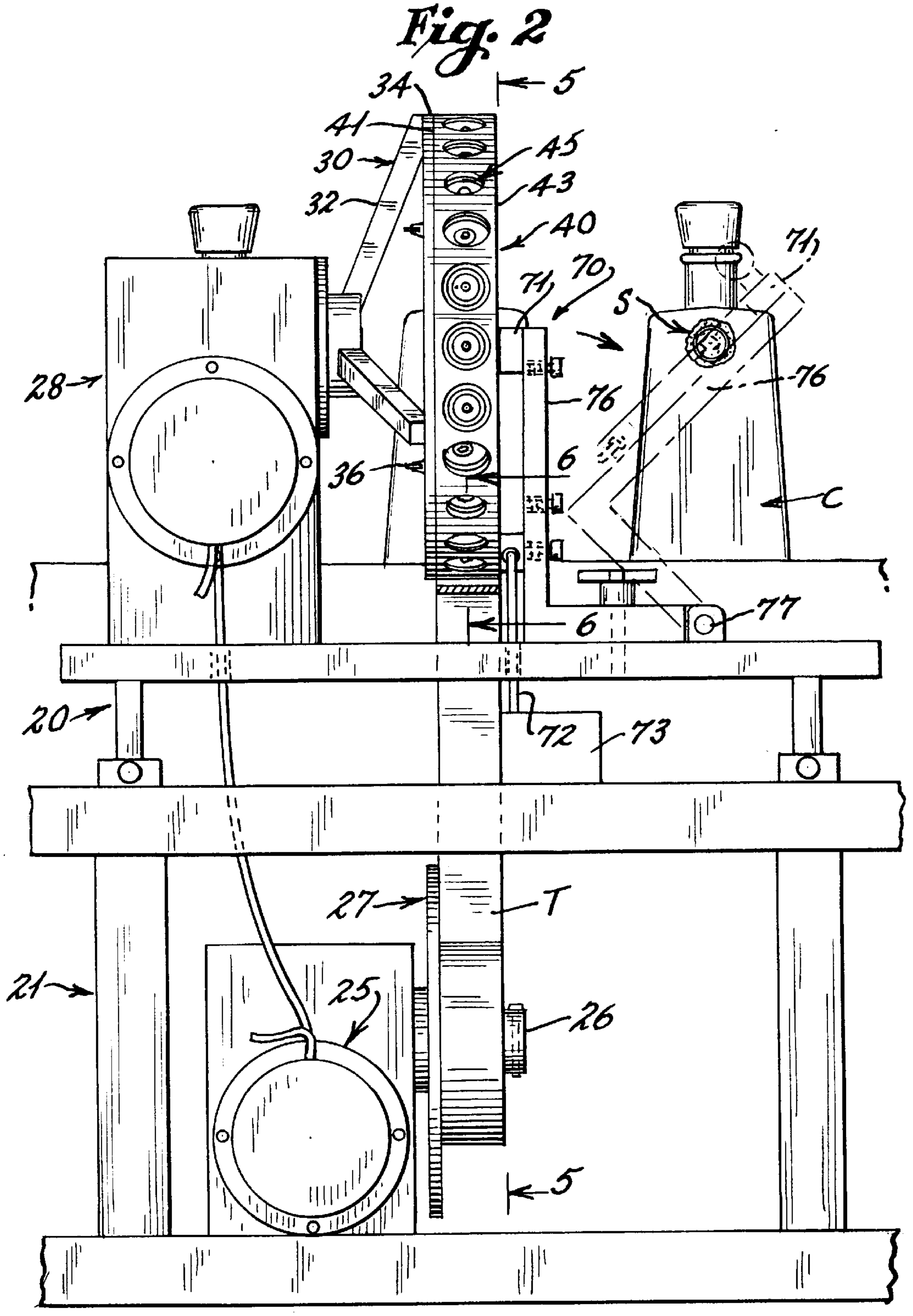
FIG. 2 is a front elevational view of the applicator of FIG. 1.

With particular reference to FIG. 2, the vaccuum housing 71 may be mounted to an L-shaped supporting bracket 76 which is pivotally mounted at 77 to the stand 21. In this manner, the housing may be pivoted away from the transfer ring 40 in order to allow the ring to be interchanged with a different ring. Thereafter, the vaccuum housing may be pivoted back into engagement with the outer side wall of a new transfer ring. It should be noted that the vaccuum housing may be alternately adjacent with openings provided through the opposite end wall or elsewhere along the transfer ring.

Figure 5:
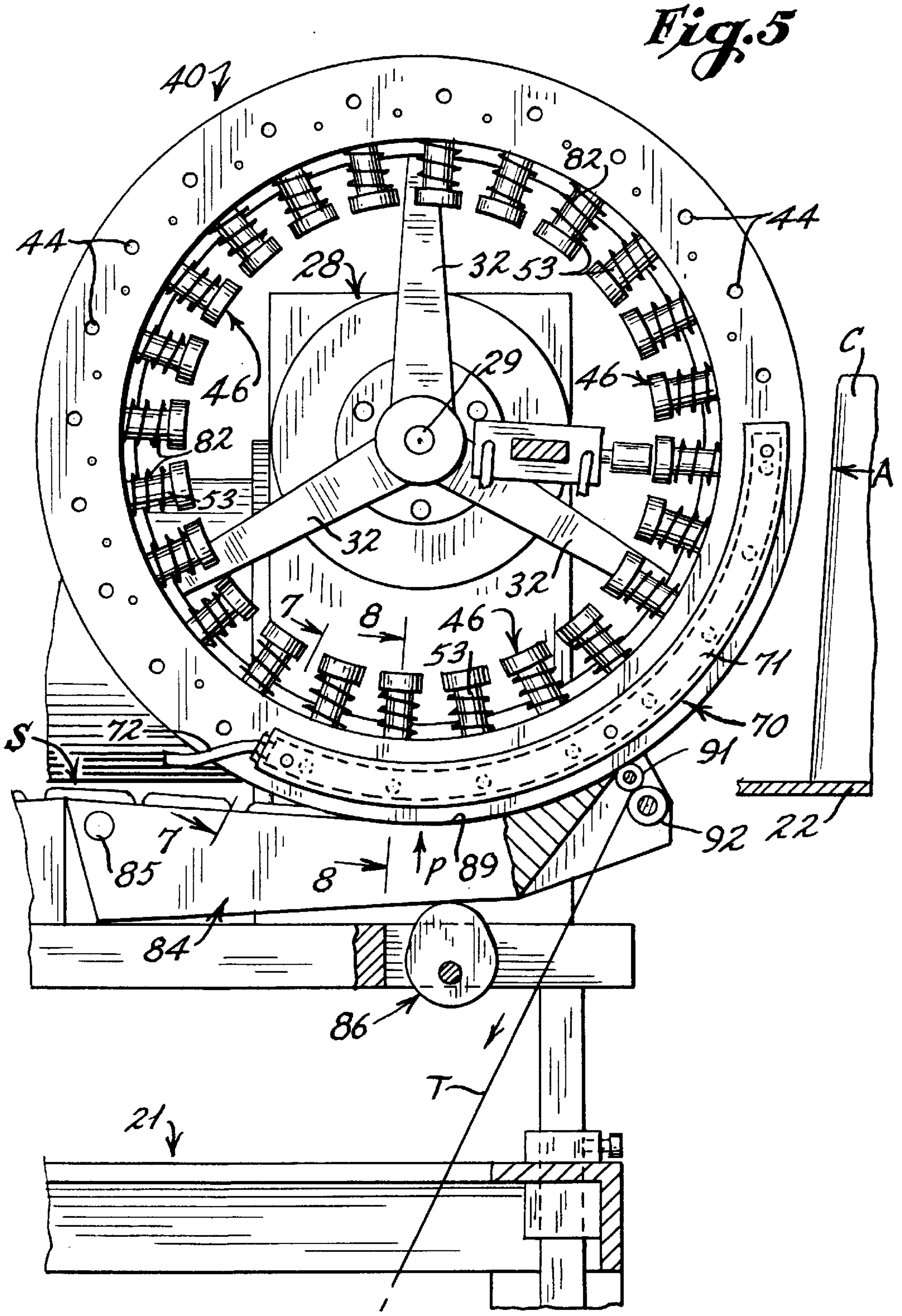
FIG. 5 is an enlarged cross-sectional view taken along line 5—5 of FIG. 2.
Figure 9:
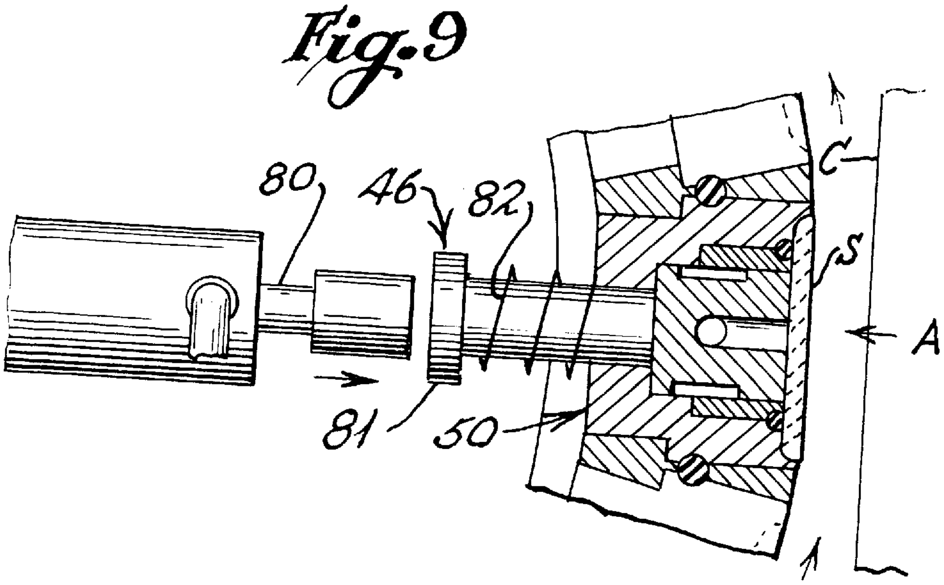
FIGS. 9 and 10 are cross-sectional illustrational views showing the activation of one of the plunger elements associated with the transfer ring of the present invention as it is initially aligned with a container and thereafter urged outwardly to place the seal on the container.
Figure 10:
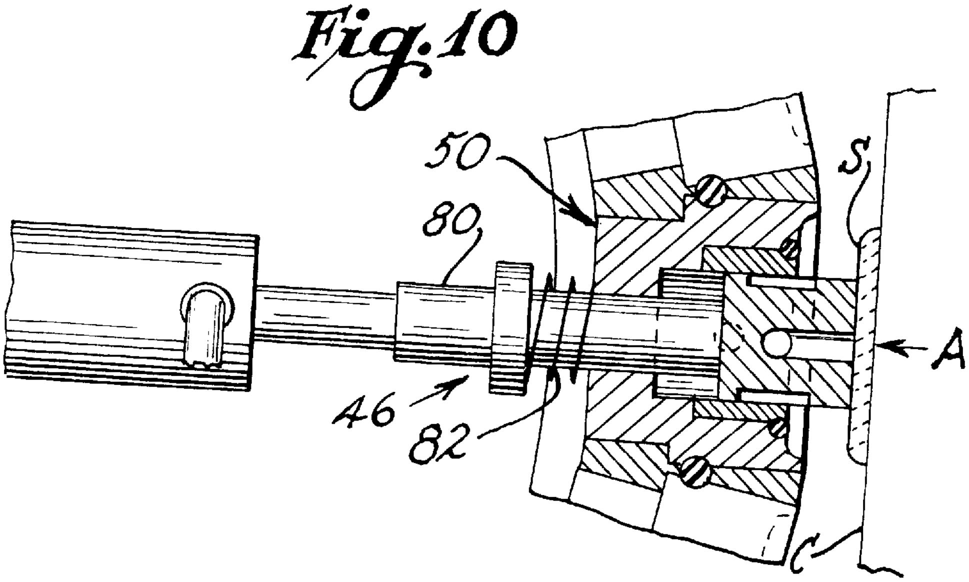
Figure 11:
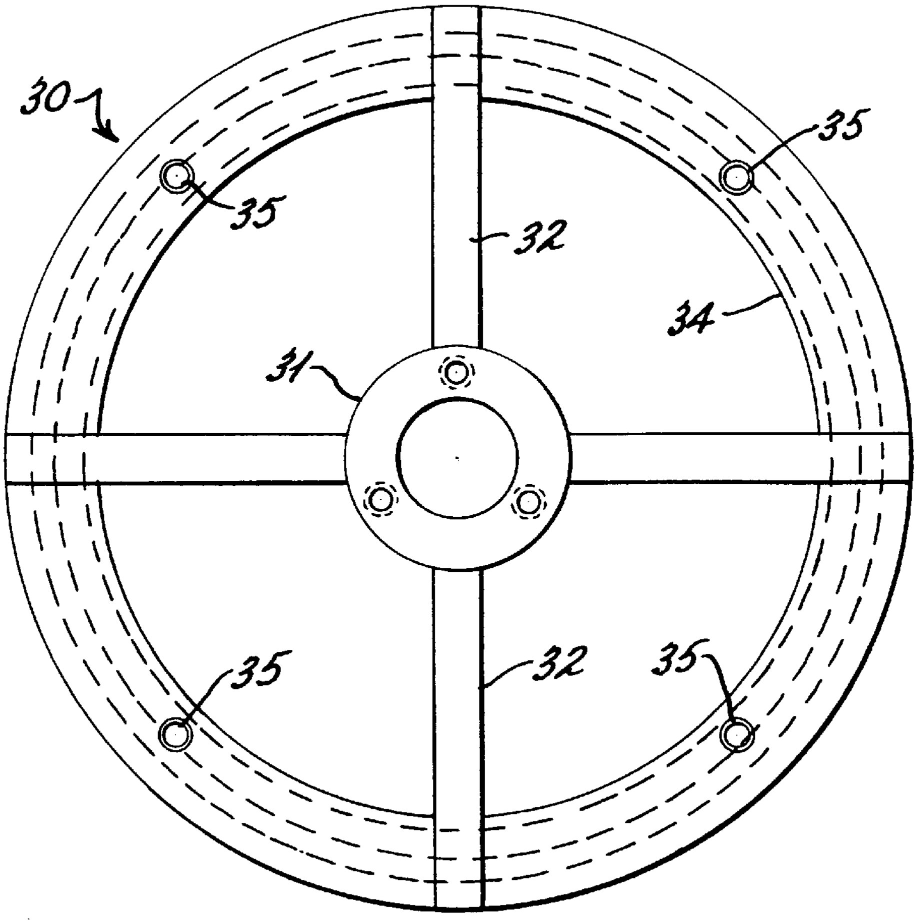
FIG. 11 is a rear elevational view showing the sprocket wheel for securing the transfer rings of the present invention to an indexing device.

With specific reference to FIGS. 5, 9 and 10, the actuator for applying the seals to the containers is disclosed in greater detail. As the transfer ring is indexed towards an appropriate alignment with a container at application point "A", a piston 80 is automatically activated and engages a driving end 81 of the plunger 46. As shown in FIG. 10, the piston 80 forces the plunger against a spring 82 which is engageable between the driving end 81 of the plunger and the inner surface of the bushing, thereby forcing the plunger outwardly so that the head thereof forces the seal against the container. The spring 82 automatically returns the plunger to its fully recessed position within the receivers as soon as the seal has been applied.

To further facilitate the manner in which the seals are applied to the containers and as previously mentioned, the seals may be formed with an upstanding annular rim "R". The rim may be engageable by the face portion of the head of the plunger. This allows the seal to be applied at a point where there will be no damage to any relief characteristics which are molded into the face of the seal. This will also assist in maintaining the vaccuum between the head of the plunger and the seal.

The piston 80 is driven by a solenoid although any other type of operating mechanism, such as pneumatic pressure or cam, may be utilized to drive the plunger 46 to seat the seals against the containers. The spacing between the transfer ring and the containers may vary somewhat and still allow for an appropriate application of pressure to be applied by the plungers to securely seat the seals to the containers.

As previously noted, the indexing device 28 which drives the transfer ring is driven in synchronization with the indexing device 25 of the take up reel 27. The carrier tape or strip "T" is directed over an adjustable guide 84 which supports the tape as the seals approach the receivers 45 of the transfer ring. The tape thereafter passes through a pair of guide rollers 91 and 92 which redirect the tape to the take up reel 27.

As the thickness dimension of the seals may vary from application to application, the present applicator is designed to allow the tape to be adjusted relative to the receivers 45 at the transfer point "P". As shown in FIGS. 3 and 5, the guide 84 is pivotable about a pivot pin 85 and is raised and lowered utilizing a rotatable cam 86 connected to, an operating handle 87. By adjusting the angle of the cam 86 relative to the bottom surface 88 of the adjustable guide, the relative spacing between the curved upper surface 89 of the guide relative to the transfer ring may be selectively adjusted.

In the operation of the preferred embodiment of the present invention, a continuous supply of seals "S" are adhesively mounted on a backing tape "T". The tape "T" is supported over a curved upper surface 89 of a guide 84 and a lead portion of the tape is engaged with the take up reel 27. When the conveyor carrying the containers is activated to move the containers relative to the applicator, the stepping or indexing devices 25 and 28 are activated in synchronization with one another to begin indexing the take up reel 27 and the transfer ring 40. As the ring indexes over each successive seal "S", the receiver approaching the seal comes into communication with the vaccuum housing 71 wherein a suction is applied in the receiver which is sufficient to reduce the pressure so as to urge the adjacent seal into the receiver. Thereafter, as the transfer ring indexes from the transfer point "P" to the application point "A", the seals are retained in the receiver 45 under the vaccuum applied from the vaccuum source. As the receiver reaches the application point "A", the piston 80 is activated to engage the plunger 46 slidably disposed within the receiver, thereby forcing the plunger to urge the seal outwardly into contact with the container wall. As the vaccuum is still applied at the application point, the seal will be retained against the surface of the head of the plunger until adhesively secured to the container.

Should it become necessary to change the overall dimensions of the receivers 45, the indexing wheel may be changed by simply pivoting the vaccuum assembly away from the transfer ring and releasing the transfer ring by removing it from the sprocket wheel. Thereafter, a different ring may be applied to the sprocket wheel, allowing different sizes of seal to be applied to containers being conveyed relative to the applicator.

What is claimed is:

1. An applicator for transferring and applying three-dimensional seals which are carried in spaced relationship on a carrier tape to containers being conveyed relative to the applicator, the applicator comprising:

a transfer ring having a rear wall and a front wall and an annular peripheral wall, means for mounting said transfer ring to a first indexing device for rotating said transfer ring, said transfer ring including a plurality of spaced receivers recessed in said peripheral wall of a size to at least partially contain a three-dimensional seal therein, a plunger means reciprocally mounted within each of said receivers and moveable from a first position inwardly of each of said receivers to a second position extending outwardly of said peripheral wall, a vaccuum means associated with said transfer ring for applying a reduced pressure in said receivers when said receivers are positioned adjacent a seal transfer point wherein seals are removed from the carrier tape to a seal application point wherein seals are transferred to a container, an activator means mounted within said transfer ring adjacent said application point, said activator means being engagable with a plunger means within an aligned receiver at the transfer point for urging said plunger means outwardly of said aligned receiver to thereby force a seal contained therein into contact with an aligned container, guide means mounted adjacent said transfer ring at the transfer point for guiding the carrier strip relative to the transfer ring, and means for conveying the carrier tape along said guide means so as to continuously align seals on the carrier tape with said receivers of said transfer ring.

2. The applicator of claim 1 wherein said means for mounting said transfer ring to said first indexing device includes a sprocket wheel and means for releaseably engaging said transfer ring to said sprocket wheel.

3. The applicator of claim 1 including means for adjusting said guide means relative to said transfer ring whereby the spacing between said guide means and said transfer ring may be selectively adjusted to compensate for seals having differing dimensions.

4. The applicator of claim 1 wherein said vaccuum means includes a vaccuum header mounted adjacent said transfer ring and extending from adjacent said seal transfer point to adjacent said seal application point, means for sealing said vaccuum header relative to said transfer ring, a plurality of spaced openings in said transfer ring for communicating said vaccuum header with a passageway in each of said plunger means.

5. The applicator of claim 4 including pivoting means for pivotally supporting said vaccuum header adjacent said transfer ring whereby said vaccuum header is selectively movable away from said transfer ring.

6. The applicator of claim 1 including cushioning means mounted within each of said receivers for cushioning the engagement of the seals therein.

7. The applicator of claim 4 in which each of said receivers includes a hollow bushing in which one of said plunger means is movably received, an opening in each of said bushings communicating with one of said openings in said transfer ring, each of said plunger means having an outer head portion for engaging a seal, said passageway in each of said plunger means communicating said openings in each of said bushings with said receivers through said head portion of said plunger means.

8. The applicator of claim 7 including a sleeve mounted within each of said bushings for guiding said plunger means with respect thereto.

9. The applicator of claim 7 including resilient means mounted adjacent each of said plunger means for normally urging said plunger means into a seated relationship within said receivers.

10. The applicator of claim 7 in which said plurality of spaced openings communicate through said front wall of said transfer ring.

11. The applicator of claim 1 in which said means for conveying the carrier tape includes a takeup reel, said takeup reel being mounted to a second indexing device.

12. An applicator for transferring and applying three-dimensional seals which are supplied thereto from a source of supply to containers being conveyed relative to the applicator, the applicator comprising:

a transfer ring having a rear wall and a front wall and an annular peripheral wall, means for mounting said transfer ring to a first indexing device for rotating said transfer ring, said transfer ring including a plurality of spaced receivers recessed in said peripheral wall of a size to at least partially contain a three-dimensional seal therein, a plunger means reciprocally mounted within each of said receivers and moveable from a first position inwardly of each of said receivers to a second position extending outwardly of said peripheral wall, a vaccuum means associated with said transfer ring for applying a reduced pressure in said receivers when said receivers are positioned adjacent a seal transfer point wherein seals are removed from a source of supply to a seal application point wherein seals are transferred to a container, an activator means mounted within said transfer ring adjacent said application point, said activator means being engagable with a plunger means within an aligned receiver at the transfer point for urging said plunger means outwardly of said aligned receiver to thereby force a seal contained therein into contact with an aligned container, and guide means mounted adjacent said transfer ring at the transfer point for guiding the seals from said source of supply to the transfer ring.

13. The applicator of claim 12 wherein said means for mounting said transfer ring to said first indexing device includes a sprocket wheel and means for releaseably engaging said transfer ring to said sprocket wheel.

14. The applicator of claim 12 including cushioning means mounted within each of said receivers for cushioning the engagement of the seals therein.

15. The applicator of claim 12 wherein said vaccuum means includes a vaccuum header mounted adjacent said transfer ring and extending from adjacent said seal transfer point to adjacent said seal application point, means for sealing said vaccuum housing relative to said transfer ring, a plurality of spaced openings in said transfer ring for communicating said vaccuum header with a passageway in each of said plunger means.

16. The applicator of claim 15 including pivoting means for pivotally supporting said vaccuum header adjacent said transfer ring whereby said vaccuum header is selectively movable away from said transfer ring.

17. The applicator of claim 15 in which each of said receivers includes a hollow bushing in which one of said plunger means is movably received, an opening in each of said bushings communicating with one of said openings in said transfer ring, each of said plunger means having an outer head portion for engaging a seal, said passageway in each of said plunger means communicating said openings in each of said bushings with said receivers through said head portion of said plunger means.

18. An applicator for transferring and applying three-dimensional seals having varying surface configurations which are carried in spaced relationship on a carrier tape to containers being conveyed relative to the applicator, the seals having a maximum outer dimension, the applicator comprising:

a transfer ring having a rear wall and a front wall and an annular peripheral wall, means for mounting said transfer ring to a first indexing device for rotating said transfer ring, said transfer ring including a plurality of spaced receivers recessed in said peripheral wall of a size to cooperatively contain a three-dimensional seal therein, each of said receivers having a maximum outer dimension slightly greater than the maximum dimension of the seals, a plunger means reciprocally mounted within each of said receivers and moveable from a first position inwardly of each of said receivers to a second position extending outwardly of said peripheral wall, a vaccuum means associated with said transfer ring for applying a reduced pressure in said receivers when said receivers are positioned adjacent a seal transfer point wherein seals are removed from the carrier tape to a seal application point wherein seals are transferred to a container, an activator means mounted within said transfer ring adjacent said application point, said activator means being engagable with a plunger means within an aligned receiver at the transfer point for urging said plunger means outwardly of said aligned receiver to thereby force a seal contained therein into contact with an aligned container, guide means mounted adjacent said transfer ring at the transfer point for guiding the carrier strip relative to the transfer ring, and means for conveying the carrier tape along said guide means so as to continuously align seals on the carrier tape with said receivers of said transfer ring.

19. The applicator of claim 18 wherein said vaccuum means includes a vaccuum header mounted adjacent said ring and extending from adjacent said seal transfer point to adjacent said seal application point, means for sealing said vaccuum housing relative to said transfer ring, a plurality of spaced openings in said transfer ring for communicating said vaccuum header with a passageway in each of said plunger means, and cushioning means mounted within each of said receivers for cushioning the engagement of the seals therein.

20. The applicator of claim 18 including means for adjusting said guide means relative to said transfer ring whereby the spacing between said guide means and said transfer ring may be selectively adjusted to compensate for seals having differing dimensions.

* * * * *